US012400526B1

(12) United States Patent
Rivera Gonzalez et al.

(10) Patent No.: US 12,400,526 B1
(45) Date of Patent: Aug. 26, 2025

(54) SECURE KIOSK WITH A SEALING WEDGE

(71) Applicant: Musco Corporation, Oskaloosa, IA (US)

(72) Inventors: Antonio Rivera Gonzalez, Oskaloosa, IA (US); Jesse D. Greenhalgh, Oskaloosa, IA (US); Michael D. Brangoccio, Waukee, IA (US); Zachary L Harger, Oskaloosa, IA (US); Kaitlyn D. Anderson, Oskaloosa, IA (US)

( * ) Notice: Subject to any disclaimer, the term of this patent is extended or adjusted under 35 U.S.C. 154(b) by 288 days.

(21) Appl. No.: 18/299,380

(22) Filed: Apr. 12, 2023

Related U.S. Application Data

(60) Provisional application No. 63/331,275, filed on Apr. 15, 2022.

(51) Int. Cl.
*G07G 1/00* (2006.01)

(52) U.S. Cl.
CPC .................................. *G07G 1/0018* (2013.01)

(58) Field of Classification Search
CPC .................................................... G07G 1/0018
USPC ......................................................... 235/383
See application file for complete search history.

(56) References Cited

U.S. PATENT DOCUMENTS

2017/0186284 A1* 6/2017 Nozaki ..................... G06F 1/16
2023/0092141 A1* 3/2023 Nicewick ............... F16M 11/10
235/61 R

* cited by examiner

*Primary Examiner* — Suezu Ellis
(74) *Attorney, Agent, or Firm* — Zachary S. Pratt; Kurt J. Fugman

(57) ABSTRACT

An electronic kiosk includes a base. The electronic kiosk also includes a user interface panel attached to at least a first portion of a top of the base via one or more hinges. The electronic kiosk further includes a sealing wedge removably attached to at least a second portion of the top of the base. When the sealing wedge is attached to the top of the base, the user interface panel is locked in place atop the base. When the sealing wedge is removed from the base, the user interface panel is movable about the one or more hinges.

16 Claims, 9 Drawing Sheets

SECURE KIOSK WITH A SEALING WEDGE

RELATED APPLICATIONS

This application claims the benefit of U.S. Provisional Application No. 63/331,275, filed Apr. 15, 2022, the entire contents of which are incorporated herein by reference.

TECHNICAL FIELD

The disclosure relates to electronic kiosk devices. More specifically, this disclosure is directed to a secure kiosk with a sealing wedge.

BACKGROUND

In modern, interactive societies, informational exhibits, such as educational, scientific, or navigation-based displays, benefit from having interactive and dynamic displays. Rather than simply hang a static poster or plaque on a wall, allowing users to interact with the exhibits generally creates a more memorable exhibit that is easily interpreted by users of the exhibits. Electronic kiosks have been an example of such an interactive, informational exhibit.

Electronic kiosks provide numerous benefits. These kiosks are generally cost-effective to build, can be placed in any number of locations, and provide a large enough display to allow multiple people to gather around the kiosk at a same time. Kiosks are additionally easily fitted with particular hardware to allow the kiosk to have a dedicated informational purpose and only show particular user interfaces, as opposed to general-purpose computers and tablets.

However, electronic kiosks generally have severe drawbacks. As electronics are often housed within the kiosk itself, the developer must consider a tradeoff between security and accessibility. If an electronic kiosk is secure, it is often difficult to access the electronics inside of the kiosk for repair and replacement purposes, leading to increased maintenance costs and physically tolling repair processes. If the electronic kiosk is accessible, it is often difficult for the owner to prevent unauthorized access to valuable electronic components inside of the kiosk, leading to vandalism and theft. Additionally, as with many electronic devices, these kiosks are limited to indoor use so as to keep the electronic kiosks out of harmful weather.

SUMMARY

In general, the disclosure is directed to an improved electronic kiosk that includes a removable sealing wedge. When the sealing wedge is in place, a user interface panel is locked in place, restricting access to electronic components that may be on the interior of the electronic kiosk. When the sealing wedge is removed, the user interface panel may open, such as through the use of one or more hinges, to grant access to the electronic components for authorized users. Inside the electronic kiosk, electronic components may be installed to boards that are slidable up a rail to raise out of the base of the electronic kiosk when the user interface panel is lifted. The user interface panel may further have access panels on an underside of the user interface panel, enabling secure access to the components in the user interface panel only when the user interface panel is lifted. In some instances, the electronic kiosk may further include weatherproofing elements, such as acrylic surfacing on a user-facing portion of the user interface or a gasket between the sealing wedge, the user interface panel, and/or the base.

The electronic kiosk described herein provides numerous benefits. By including a locking sealing wedge, the security of the electronic kiosk is improved over previous mechanisms, such as doors or padlocks. A sealing wedge, when locked, does not provide an access point to the interior of the electronic kiosk unless the sealing wedge is unlocked and physically removed, thereby protecting the kiosk from vandalism and theft. Additionally, the user interface panel swinging open atop the base provides easier access to the electronic components housed therein, removing the tradeoff between security and accessibility present in most systems. The presence of the weatherproofing elements also enables these electronic kiosks to be placed outdoors, such as at fairgrounds, outdoor educational exhibits, and parks. Additional benefits include that the sealing wedge can angle the user interface panel in such a way that the display component in the user interface panel is visible to those of smaller stature, including children, or disabled individuals confined to wheelchairs.

In one example, the disclosure is directed to an electronic kiosk. The electronic kiosk includes a base. The electronic kiosk also includes a user interface panel attached to at least a first portion of a top of the base via one or more hinges. The electronic kiosk further includes a sealing wedge removably attached to at least a second portion of the top of the base. When the sealing wedge is attached to the top of the base, the user interface panel is locked in place atop the base. When the sealing wedge is removed from the base, the user interface panel is movable about the one or more hinges.

In another example, the disclosure is directed to a method for accessing one or more electronic components in an electronic kiosk. The method includes removing a sealing wedge removably attached to at least a first portion of a top of a base of the electronic kiosk. The method further includes lifting a user interface panel of the electronic kiosk, the user interface panel being attached to at least a second portion of the top of the base via one or more hinges, wherein lifting the user interface panel reveals an interior compartment of the base of the electronic kiosk. The method also includes sliding a board slidably attached to a rail in the base upwards to elevate the board such that at least a portion of the board is above the top of the base, wherein the one or more electronic components are secured to the board. The method further includes accessing the one or more electronic components secured to the board.

In another example, the disclosure is directed to any device, method, combination of devices, or combination of methods described herein.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

The following drawings are illustrative of particular examples of the present disclosure and therefore do not limit the scope of the invention. The drawings are not necessarily to scale, though examples can include the scale illustrated, and are intended for use in conjunction with the explanations in the following detailed description wherein like reference characters denote like elements. Examples of the present disclosure will hereinafter be described in conjunction with the appended drawings.

DETAILED DESCRIPTION

The following detailed description is exemplary in nature and is not intended to limit the scope, applicability, or configuration of the techniques or systems described herein in any way. Rather, the following description provides some practical illustrations for implementing examples of the techniques or systems described herein. Those skilled in the art will recognize that many of the noted examples have a variety of suitable alternatives.

Figure 1:
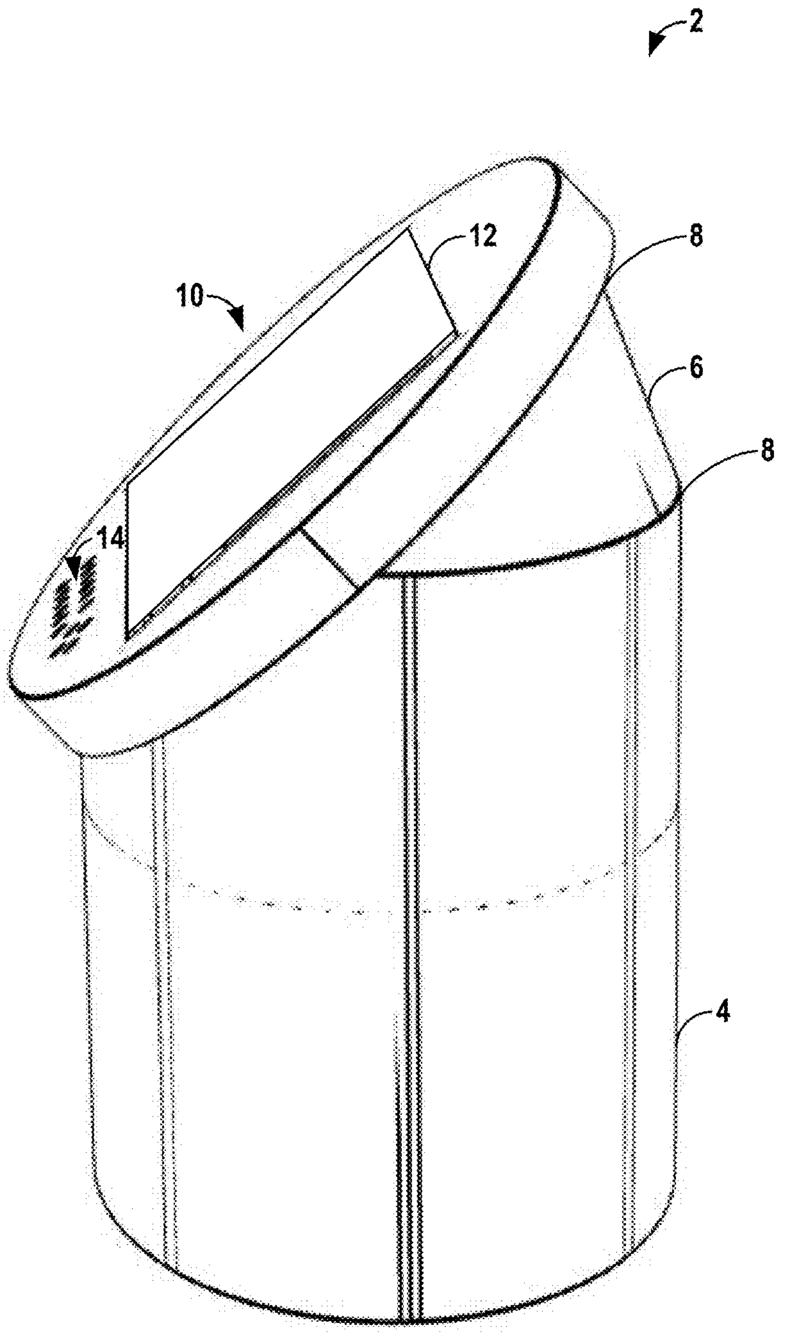
FIG. 1 is a conceptual diagram illustrating a side perspective view of an electronic kiosk with a sealing wedge, in accordance with the techniques and devices described herein.

FIG. 1 is a conceptual diagram illustrating a side perspective view of electronic kiosk 2 with sealing wedge 6, in accordance with the techniques and devices described herein. Electronic kiosk 2 may be any electronic device that may generate output, such as visual or audible output, for consumption by a user of the electronic device. For instance, electronic kiosk may be an informational kiosk placed in a museum, park, shopping mall, or any other location where providing information in an interactive manner may create a better experience for the user, such as a solar system exhibit. For instance, in the solar system exhibit, an instance of electronic kiosk 2 may be placed at relative locations indicative of relative distances between celestial bodies, with each instance of electronic kiosk 2 providing information to users about a particular celestial body.

Electronic kiosk 2 may be decorated in any manner. Electronic kiosk 2 may be branded with advertisements or decorated to indicate the one or more objects that electronic kiosk 2 may provide information about.

Electronic kiosk 2 includes base 4. Base 4 may be an enclosed structure that provides height to electronic kiosk 2. Base 4 may be made of any material suitable for such a structure, including wood, aluminum or other metal, fiberglass, plastic, or any other material that provides adequate structure and protection to electronic kiosk 2.

Base 4 may protect various internal components of electronic kiosk 2, such as one or more electronic components housed within base 4. Examples of such electronic components include any one or more of one or more processors, one or more communication units, one or more power sources, one or more output components, one or more input components, and one or more storage components.

The one or more processors may implement functionality and/or execute instructions associated with software running on electronic kiosk 2. Examples of processors include application processors, display controllers, auxiliary processors, one or more sensor hubs, and any other hardware configured to function as a processor, a processing unit, or a processing device.

The one or more communication units may communicate with external devices via one or more wired and/or wireless networks by transmitting and/or receiving network signals on one or more networks. Examples of communication units include a network interface card (e.g., such as an Ethernet card), an optical transceiver, a radio frequency transceiver, a GPS receiver, a radio-frequency identification (RFID) transceiver, a near-field communication (NFC) transceiver, or any other type of device that can send and/or receive information. Other examples of communication units may include short wave radios, cellular data radios, wireless network radios, as well as universal serial bus (USB) controllers.

The one or more output components may generate output in a selected modality. Examples of modalities may include a tactile notification, audible notification, visual notification, machine generated voice notification, or other modalities. Output components, in one example, include a presence-sensitive display, a sound card, a video graphics adapter card, a speaker, a cathode ray tube (CRT) monitor, a liquid crystal display (LCD), a light emitting diode (LED) display, an organic LED (OLED) display, a virtual/augmented/extended reality (VR/AR/XR) system, a three-dimensional display, or any other type of device for generating output to a human or machine in a selected modality.

The one or more input components may receive input. Examples of input are tactile, audio, and video input. Input components, in one example, include a presence-sensitive input device (e.g., a touch sensitive screen, a PSD), mouse, keyboard, voice responsive system, camera, microphone or any other type of device for detecting input from a human or machine. In some examples, input components may include one or more sensor components. Sensors may include one or more biometric sensors (e.g., fingerprint sensors, retina scanners, vocal input sensors/microphones, facial recognition sensors, cameras), one or more location sensors (e.g., GPS components, Wi-Fi components, cellular components), one or more environmental sensors (e.g., temperature, moisture, etc.), one or more movement sensors (e.g., accelerometers, gyros), one or more pressure sensors (e.g., barometer), one or more ambient light sensors, and one or more other sensors (e.g., infrared proximity sensor, hygrometer sensor, and the like). Other sensors, to name a few other non-limiting examples, may include a heart rate sensor, magnetometer, glucose sensor, olfactory sensor, compass sensor, or a step counter sensor.

The one or more storage components may store information for processing during operation of electronic kiosk 2. In some examples, the one or more storage components are a temporary memory, meaning that a primary purpose of the one or more storage components is not long-term storage. The one or more storage components may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

The one or more storage components, in some examples, also include one or more computer-readable storage media. The one or more storage components, in some examples, include one or more non-transitory computer-readable storage mediums. The one or more storage components may be configured to store larger amounts of information than typically stored by volatile memory. The one or more storage components may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories.

Electronic kiosk 2 may further include user interface panel 10, which may be attached to at least a first portion of a top of base 4 via one or more hinges (e.g., hinges 16 of FIGS. 3-6). User interface panel 10 moving about the one or more hinges provides access to an interior compartment of base 4. User interface panel 10 may include display component 12, such as a screen to output graphical content. Display component 12 may be any one or more of a presence-sensitive display, a CRT monitor, an LCD, an LED display, an OLED display, a VR/AR/XR system, a three-dimensional display, or any other type of device for generating visual output to a human or machine.

User interface panel 10 may further include input component 14. In the example of FIG. 1, input component 14 may be a series of buttons that, when pushed, cause some type of interaction with information displayed on display component 12. In other instances, input component 14 may be a different type of input device, such as a touchpad, mouse, keyboard, voice responsive system, camera, microphone or any other type of device for detecting input from a human or machine. For instance, display component 12 may display one of a plurality of user interfaces for presenting information, and input component 14 may navigate between the plurality of user interfaces.

In some instance, user interface panel 10 may include a cover to protect one or more of display component 12 or input component 14 from weather or vandalism. For instance, user interface panel 10 may include an acrylic surface, between 1/16 of an inch to upwards of an inch in depth (e.g., between 1/8 of an inch and 1/4 of an inch).

Electronic kiosk 2 may additionally include sealing wedge 6. Sealing wedge 6 may be removably attached to at least a second portion of the top of base 4. Sealing wedge 6 may be made of a similar material to base 4. Sealing wedge 6 may also be decorated to fit with a theme of the decoration of base 4.

In some instances, sealing wedge 6 may include a lock to secure the sealing wedge in place when attached to at least the second portion of the top of base 4. The second portion may be a separate portion of base 4 than the first portion where user interface panel 10 is connected, a same portion as the first portion where user interface panel 10 is connected, or a backside of the same portion as the first portion where user interface panel 10 is connected. Only authorized maintenance personnel may have access to a key for the lock in sealing wedge 6, meaning only authorized maintenance personnel may be able to unlock the lock in sealing wedge 6 in order to remove sealing wedge 6, increasing the security provided by electronic kiosk 2.

When sealing wedge 6 is attached to the top of base 4, user interface panel 10 is locked in place atop base 4. As shown in FIG. 1, sealing wedge 6, when inserted into electronic kiosk 2, restricts movement for user interface panel 10. As user interface panel 10, when opened, allows access to interior compartments and electronic components of base 4, restricting the movement of user interface panel 10 ensures that unauthorized access into the interior of base 4 is limited.

Electronic kiosk 2 may include additional weatherproofing materials. For instance, electronic kiosk 2 may include one or more gaskets 8, such as rubber gaskets, attached to various surfaces of electronic kiosk 2 in order to prevent water from entering the interior of base 4 should electronic kiosk 2 be located in an outdoor location. For instance, by attaching gaskets 8 to one or more of sealing wedge 6, user interface panel 10, and base 4, the pressure created by those components pressing together when sealing wedge 6 is inserted and locked into electronic kiosk 2 may create a watertight seal between user interface panel 10, sealing wedge 6, and base 4.

Electronic kiosk 2 may also include additional temperature control elements. For instance, electronic kiosk 2 may include one or more fans or one or more air flow vents in one or more of base 4 or an underside of user interface panel 10.

When in operation, user interface panel 10 may be situated for improved viewing by a number of different types of users. For instance, when sealing wedge 6 is installed and user interface panel 10 is lowered, user interface panel 10 may be angled to create an angle of intersection with base 4 that is either less than 90 degrees or greater than 90 degrees. If user interface panel 10 were parallel with a ground surface and perpendicular with base 4, a user may be required to be taller than electronic kiosk 2 in order to adequately view and experience electronic kiosk 2. By angling user interface panel 10, smaller individuals, or individuals with disabilities, may perceive the information on display component 12 more easily.

Figure 2:
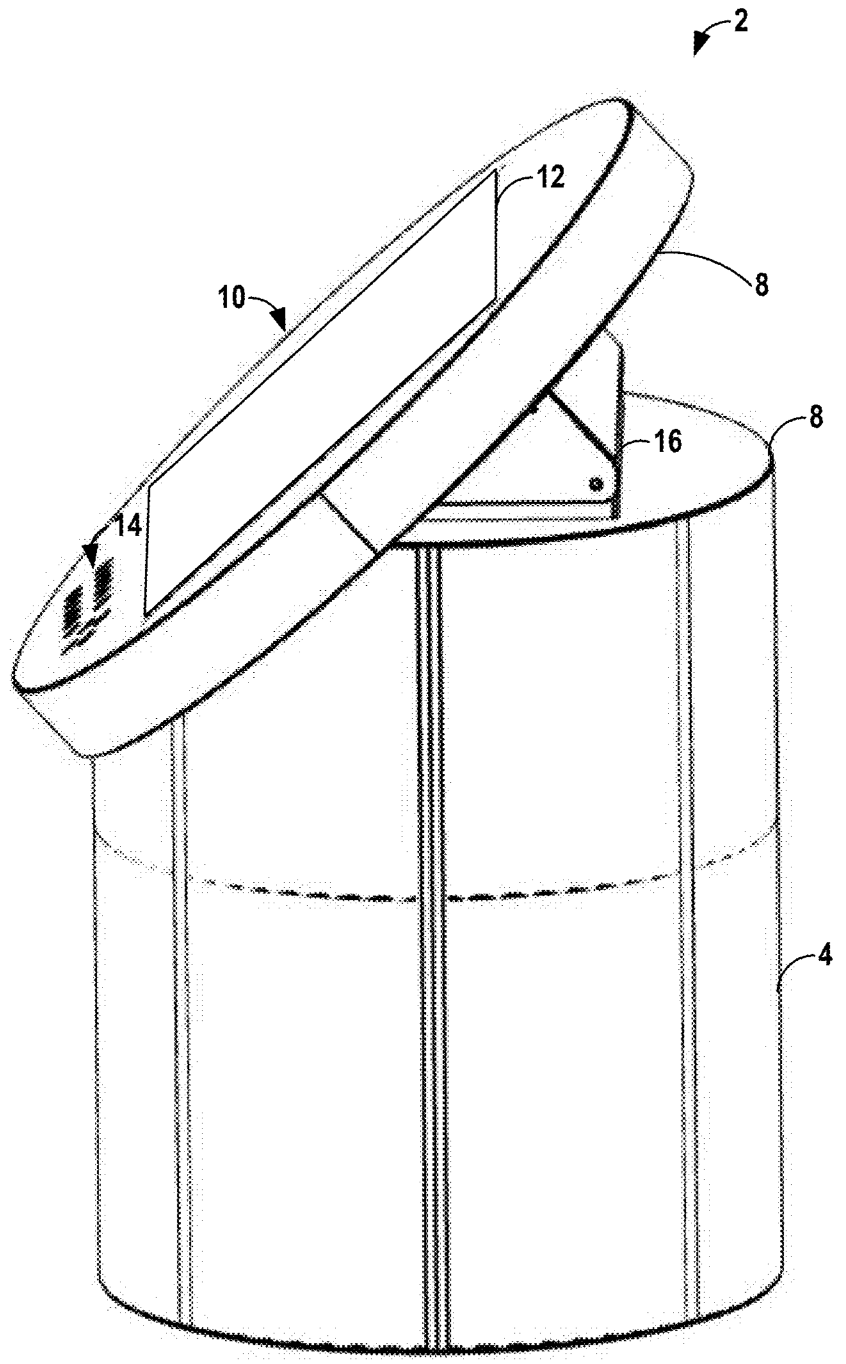
FIG. 2 is a conceptual diagram illustrating a side perspective view of an electronic kiosk with the sealing wedge removed, in accordance with the techniques and devices described herein.

FIG. 2 is a conceptual diagram illustrating a side perspective view of electronic kiosk 2 with sealing wedge 6 removed, in accordance with the techniques and devices described herein. Electronic kiosk 2 of FIG. 2 includes elements similar to previous figures, including base 4, gaskets 8, user interface panel 10, display component 12, and input component 14.

In order to access one or more electronic components in electronic kiosk 2, a user may remove sealing wedge 6 of FIG. 1, which is removably attached to base 4 of electronic kiosk 2. When sealing wedge 6 is removed from base 4, the user interface panel is movable about hinge 16, which may become exposed by the removal of sealing wedge 6. When user interface panel 10 is lifted on hinge 16, an interior compartment of base 4 may be exposed, allowing access to the interior component.

In instances where sealing wedge 6 includes a lock, removing sealing wedge 6 may include unlocking the lock securing sealing wedge 6 to base 4. After unlocking the lock, sealing wedge 6 may be removed by sliding sealing wedge 6 out of place.

Figure 3:
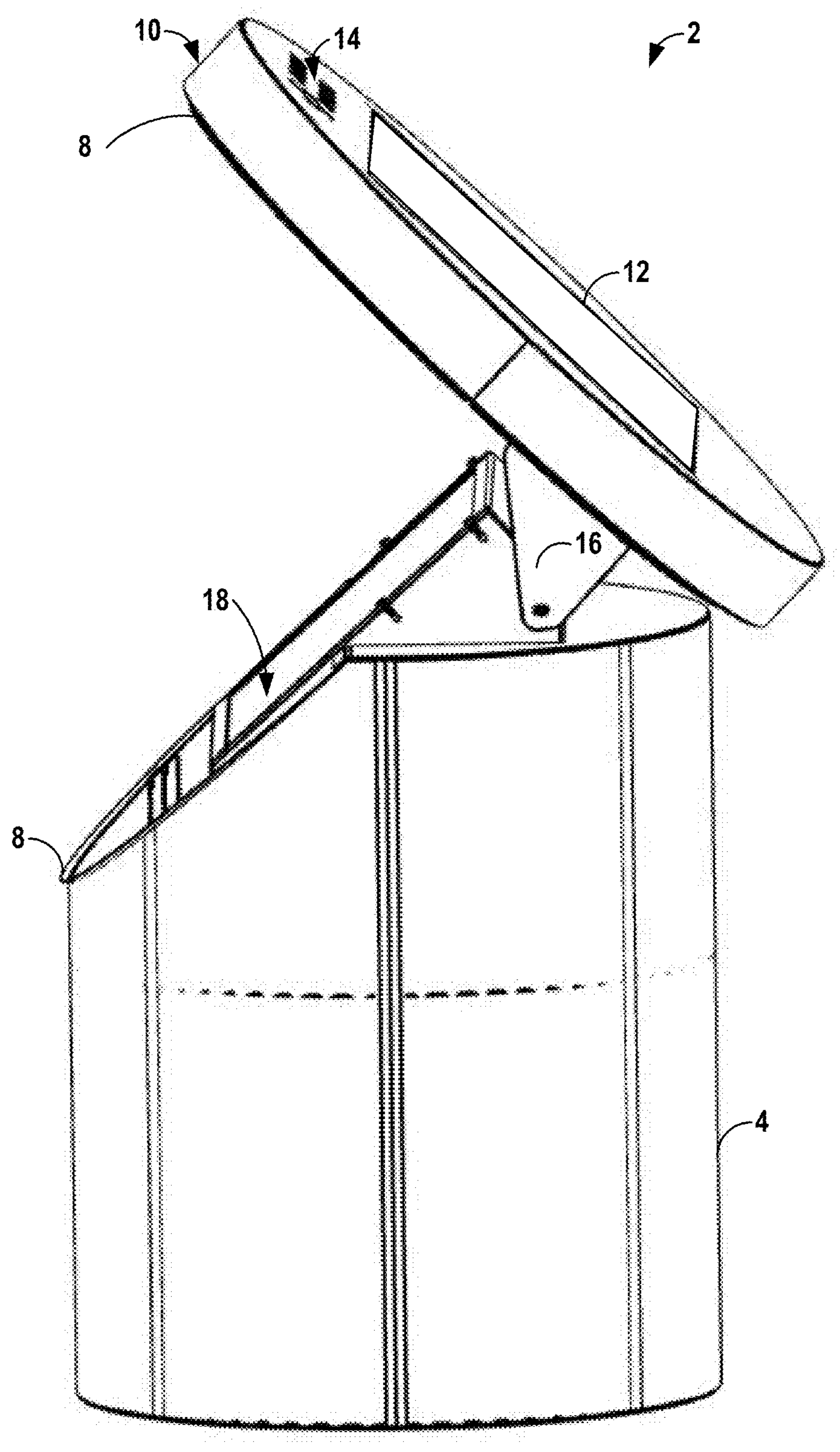
FIG. 3 is a conceptual diagram illustrating a side perspective view of an electronic kiosk with the sealing wedge removed and a user interface panel lifted, in accordance with the techniques and devices described herein.

FIG. 3 is a conceptual diagram illustrating a side perspective view of electronic kiosk 2 with sealing wedge 6 removed and user interface panel 10 lifted, in accordance with the techniques and devices described herein. Electronic kiosk 2 of FIG. 3 includes elements similar to previous figures, including base 4, gaskets 8, user interface panel 10, display component 12, input component 14, and hinge 16.

After sealing wedge 6 is removed from electronic kiosk 2, a user may lift user interface panel 10 of electronic kiosk 2 via hinge 16. Lifting user interface panel 10 reveals interior compartment 18 of base 4 of electronic kiosk 2. In some instances, in addition to sealing wedge 6 keeping user interface panel 10 in place, electronic kiosk 2 may include additional locking mechanisms (e.g., internal locks or external padlocks) securing user interface panel 10 in place.

In some instances, electronic kiosk 2 may additionally include an assistance device that applies force to assist lifting user interface panel 10 and to keep user interface panel 10 lifted when raised. In other words, the assistance device may make it easier for a user to lift user interface panel 10 on hinge 16 and may enable the user to not continuously hold user interface panel 10 above their head while they are looking into interior compartment 18. Examples of the assistance device include one or more of an electric lift, a pneumatic lift, a hydraulic lift, or a mechanical lift (e.g., a rigid or semi-rigid device stored in interior compartment 18 which can be mechanically lifted and attached to a portion of user interface panel 10 to positionally affix user interface panel 10 in a particular orientation).

Figure 4:
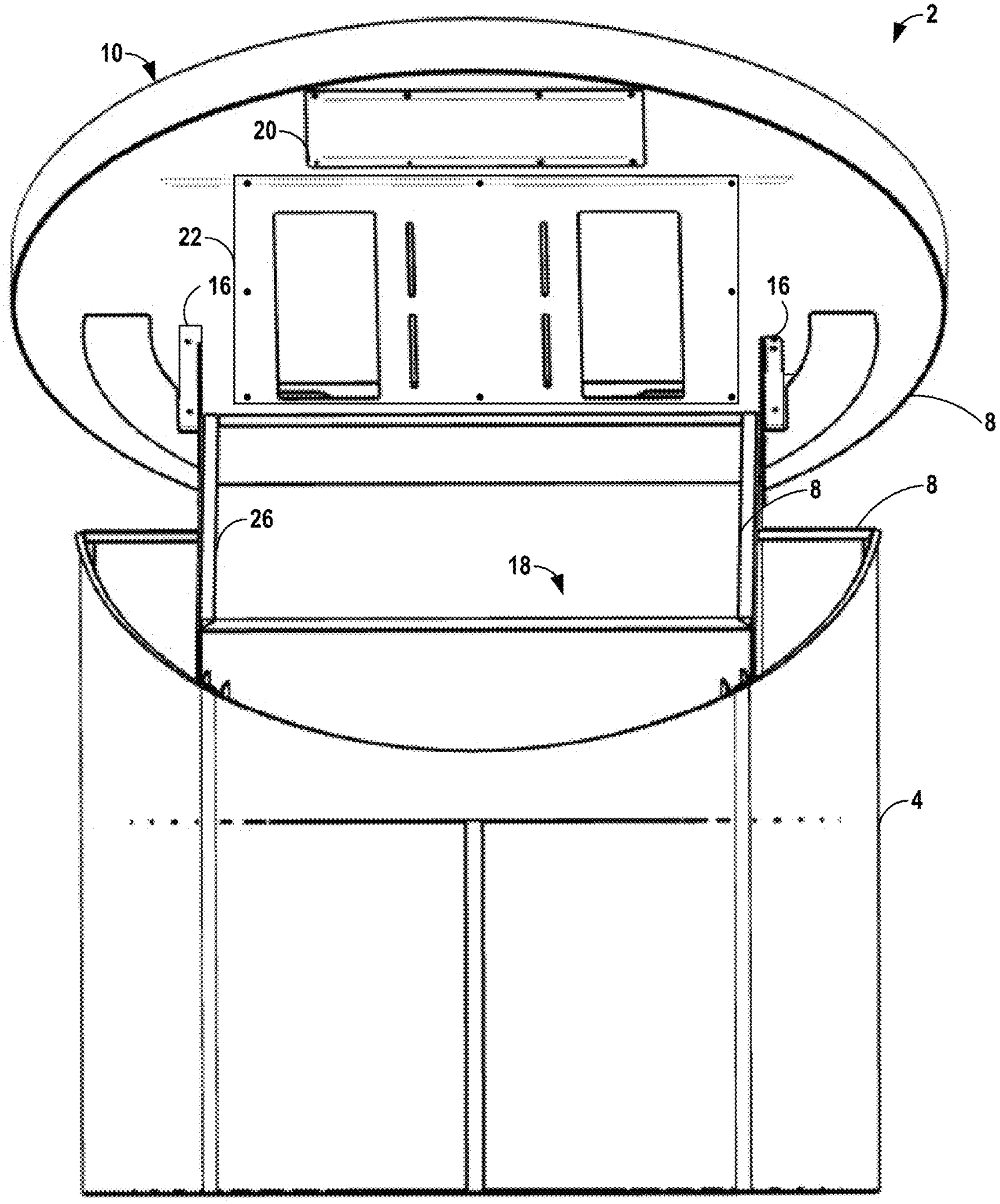
FIG. 4 is a conceptual diagram illustrating a front view of an electronic kiosk with the sealing wedge removed and a user interface panel lifted, in accordance with the techniques and devices described herein.

FIG. 4 is a conceptual diagram illustrating a front view of electronic kiosk 2 with sealing wedge 6 removed and user interface panel 10 lifted, in accordance with the techniques and devices described herein. Electronic kiosk 2 of FIG. 4 includes elements similar to previous figures, including base 4, gaskets 8, user interface panel 10, hinges 16, and interior compartment 18.

The front view of electronic kiosk 2 is in a state where user interface panel 10 shows ridge 26. As electronic kiosk 2 may be located in outdoor environments, ridge 26 may prevent water from entering interior compartment 18 both while user interface panel 10 is lifted (e.g., by water running along the edge of user interface panel 10 and down towards interior compartment 18) and while user interface panel 10 is closed (e.g., by providing an additional barrier to route any water that may get past any of gaskets 8). Additionally, in some instances, ridge 26 may include gasket 8 along a length of one or more sides of ridge 26 to further improve the liquid-tight seal provided by closing user interface panel 10 on a remainder of electronic kiosk 2.

In some instances, user interface panel 10 also includes one or more of access panels 20 and 22 on an underside of user interface panel 10. For example, access panel 22 may be removable (e.g., by snapping into place with clips or by using screws to be secured into place), and removing access panel 22 may provide access to an underside of display component 12 of user interface panel 10. Similarly, access panel 20 may be removable (e.g., by snapping into place with clips or by using screws to be secured into place), and removing access panel 20 may provide access to an underside of input component 14 of user interface panel 10. This may allow maintenance personnel to access display component 12 and/or input component 14 for the purposes of repairing or replacing the components while restricting public access to those components. Additionally, one or more of access panels 20 and 22 may include one or more apertures, allowing for improved airflow and limiting condensation within user interface panel 10.

Figure 5:
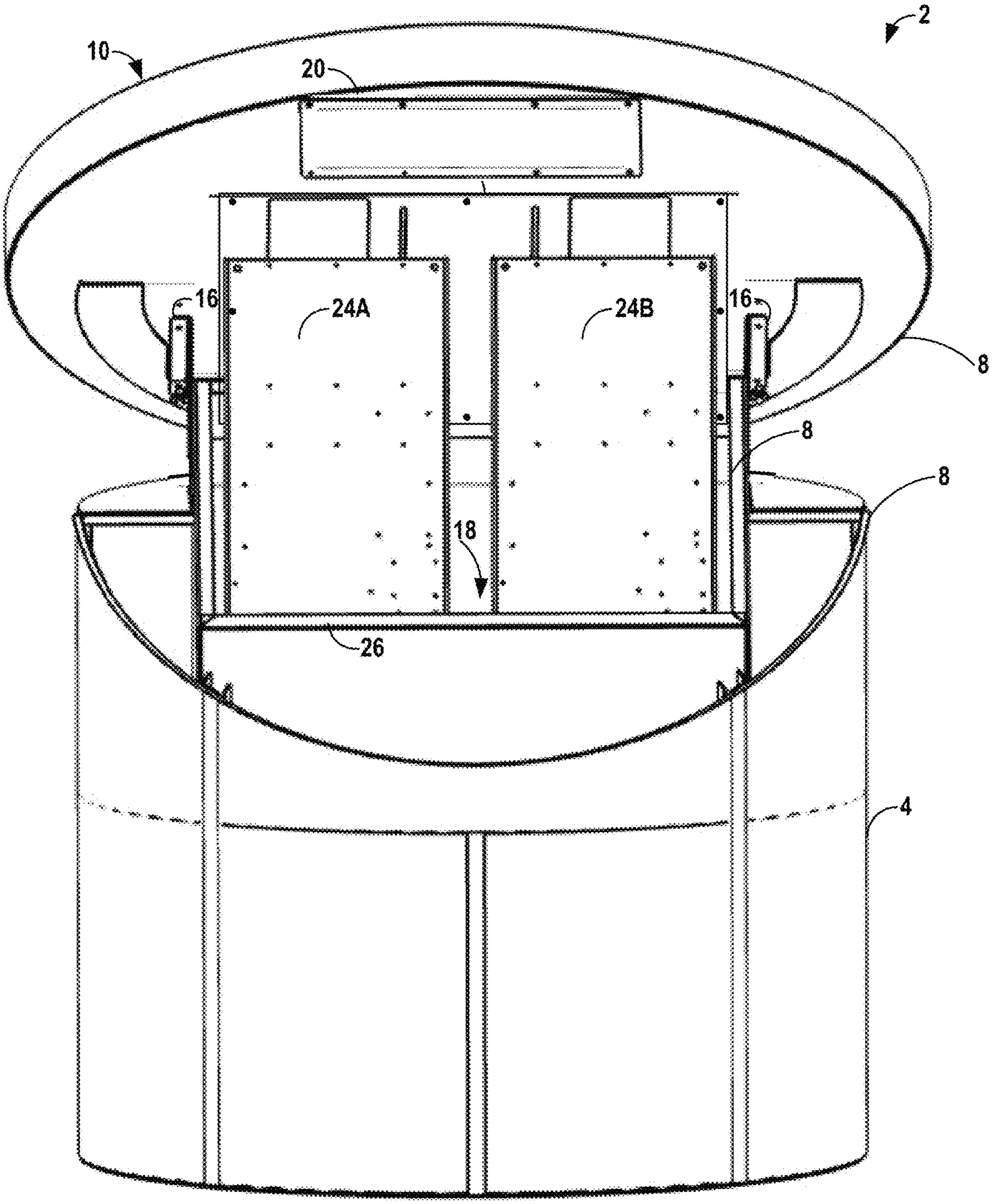
FIG. 5 is a conceptual diagram illustrating a front view of an electronic kiosk with the sealing wedge removed, a user interface panel lifted, and internal electronic boards raised, in accordance with the techniques and devices described herein.

FIG. 5 is a conceptual diagram illustrating a front view of electronic kiosk 2 with sealing wedge 6 removed, user interface panel 10 lifted, and internal electronic boards 24A and 24B raised, in accordance with the techniques and devices described herein. Electronic kiosk 2 of FIG. 5 includes elements similar to previous figures, including base 4, gaskets 8, user interface panel 10, display component 12, and input component 14.

As described above, electronic kiosk 2 may include one or more electronic components housed within base 4, such as any one or more of one or more processors, one or more communication units, one or more power sources, one or more output components, one or more input components, and one or more storage components. In order to further increase accessibility and ease of maintenance, each of the one or more electronic components may be installed on one of boards 24A and 24B, which are slidably attached to a rail in interior compartment 18 of base 4. For instance, one or more communication units may be installed on board 24A, and one or more storage components may be installed on board 24B. Boards 24A and 24B may slide up and down the rails to elevate at least a portion of boards 24A and 24B above at least a portion of the top of base 4.

With boards 24A and/or 24B raised, a user may easily access the one or more electronic components secured to one or more of boards 24A and 24B. For instance, a user may repair one of the electronic components without having to contort their body inside of interior compartment 18, the user may remove one or more electronic components from board 24A and/or 24B completely, and/or the user may attach one or more new or replacement electronic components to board 24A and/or 24B.

When the user has completed their task, the user may lower boards 24A and 24B back into interior compartment 18 of base 4 and lower user interface panel 10 of electronic kiosk 2. After user interface panel 10 is lowered, the user may re-install sealing wedge 6 back into place on base 4 of electronic kiosk 2, including potentially re-locking sealing wedge 6 to electronic kiosk 2. Additionally, in examples where electronic kiosk 2 includes one or more additional locking mechanisms to secure user interface panel 10 to base 4, the user may additionally lock the additional locking mechanisms after lowering user interface panel 10. As sealing wedge 6 has been replaced, electronic kiosk 2 may be secured for operation.

Figure 6:
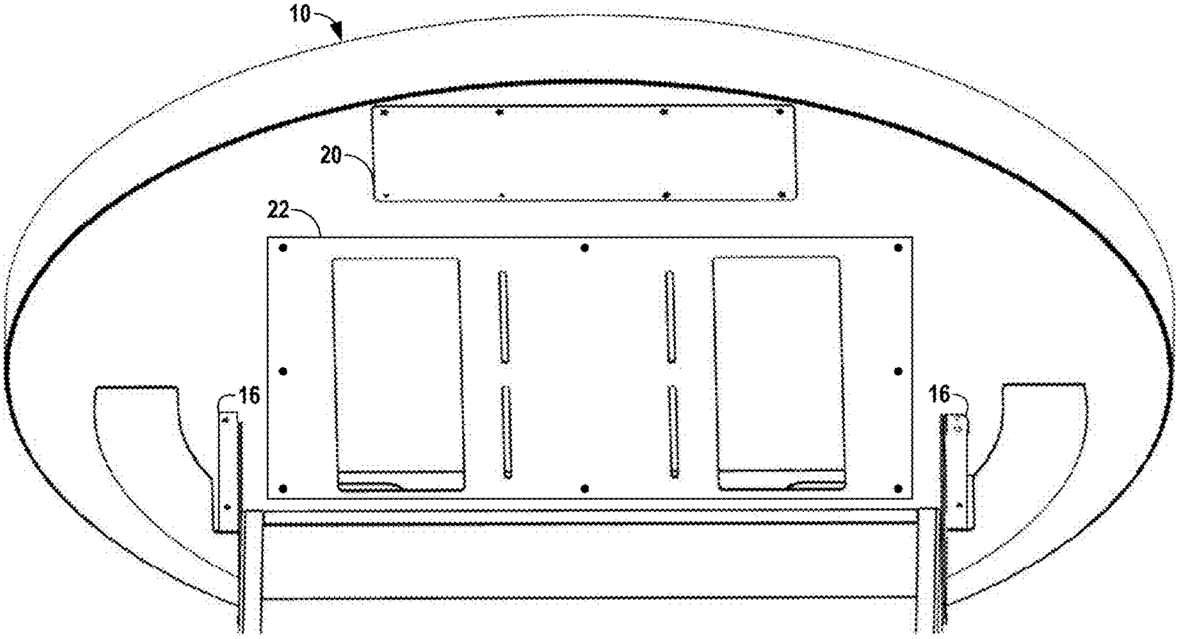
FIG. 6 is a conceptual diagram illustrating a view of an underside of a user interface panel when lifted, in accordance with the techniques and devices described herein.

FIG. 6 is a conceptual diagram illustrating a view of an underside of user interface panel 10 when lifted, in accordance with the techniques and devices described herein. In some instances, user interface panel 10 also includes one or more of access panels 20 and 22 on an underside of user interface panel 10. For example, access panel 22 may be removable (e.g., by snapping into place with clips or by using screws to be secured into place), and removing access panel 22 may provide access to an underside of display component 12 of user interface panel 10. Similarly, access panel 20 may be removable (e.g., by snapping into place with clips or by using screws to be secured into place), and removing access panel 20 may provide access to an underside of input component 14 of user interface panel 10. This may allow maintenance personnel to access display component 12 and/or input component 14 for the purposes of repairing or replacing the components while restricting public access to those components.

Electronic kiosk 2 described herein provides numerous benefits. By including sealing wedge 6, the security of electronic kiosk 2 is improved over previous mechanisms, such as doors or padlocks. Sealing wedge 6, when locked, does not provide an access point to the interior of electronic kiosk 2 unless sealing wedge 6 is unlocked and physically removed, thereby protecting electronic kiosk 2 from vandalism and theft. Additionally, user interface panel 10 swinging open atop the base provides easier access to the electronic components housed therein, removing the tradeoff between security and accessibility present in most systems. The presence of the weatherproofing elements (e.g., gaskets 8 and ridge 26) also enables electronic kiosk 2 to be placed outdoors, such as at fairgrounds, outdoor educational exhibits, and parks. Additional benefits include that sealing wedge 6 can angle user interface panel 10 in such a way that display component 12 in user interface panel 10 is visible to those of smaller stature, including children, or disabled individuals confined to wheelchairs.

Each instance of electronic kiosk 2 may further contain generic decorative elements on base 4 and sealing wedge 6. One potential use of electronic kiosk 2 is in a solar system exhibit. In such instances, base 4 and user interface panel 10 may include planet-specific decorative elements or symbols. The electronic components and display component 12 may include and present updatable educational or presentational content which can be accessed by buttons on user interface panel 10. This solves a problem which plagues many solar system installations, which that often visits are one-and-done as content is static. By including storage components and communication units in the electronic components, the content may be dynamic (and updated remotely).

Electronic kiosks 2, in some instances, may be designed for accessibility. For instance, electronic kiosk 2 may be short enough to not block views of scale models or other physical displays in the environment, yet be tall enough to be compliant with the Americans with Disabilities Act (ADA). Electronic kiosk 2 may, overall, be short enough for children to see display component 12, yet be angled enough to permit several children of several heights to view display component 12 simultaneously.

Electronic kiosk 2 may be predominantly hollow to house power and internet means, yet have some available space for sensors and fans to prevent condensation on display component 12. Electronic kiosk 2, when placed outdoors, may yet have all outdoor rated parts, yet have anti-theft means to ensure the display is not defaced or stolen, and may be installed or otherwise affixed spaced-apart feet on the order of an inch or so tall so to allow for drainage of any moisture that enters interior compartment 18, yet not be mounted so high as to allow living creatures to enter interior compartment 18. These parts and means may not impede a signal to internet means, yet may also have drainage and sealing means.

In electronic kiosk 2, each of the base 4, user interface panel 10, and sealing wedge 6 may be modular to allow quick switching out of parts, especially if the installation is in a remote area. One or more components may be lockable to deter theft, while, in some instances, base 4 may be more-or-less permanently installed on a concrete pad (although, in other instances, base 4 may be installed on other surfaces that are not permanent). Electronic kiosk 2 may still electrically shield the various internal components, and each of the components described herein may be easily fabricated.

Figure 7:
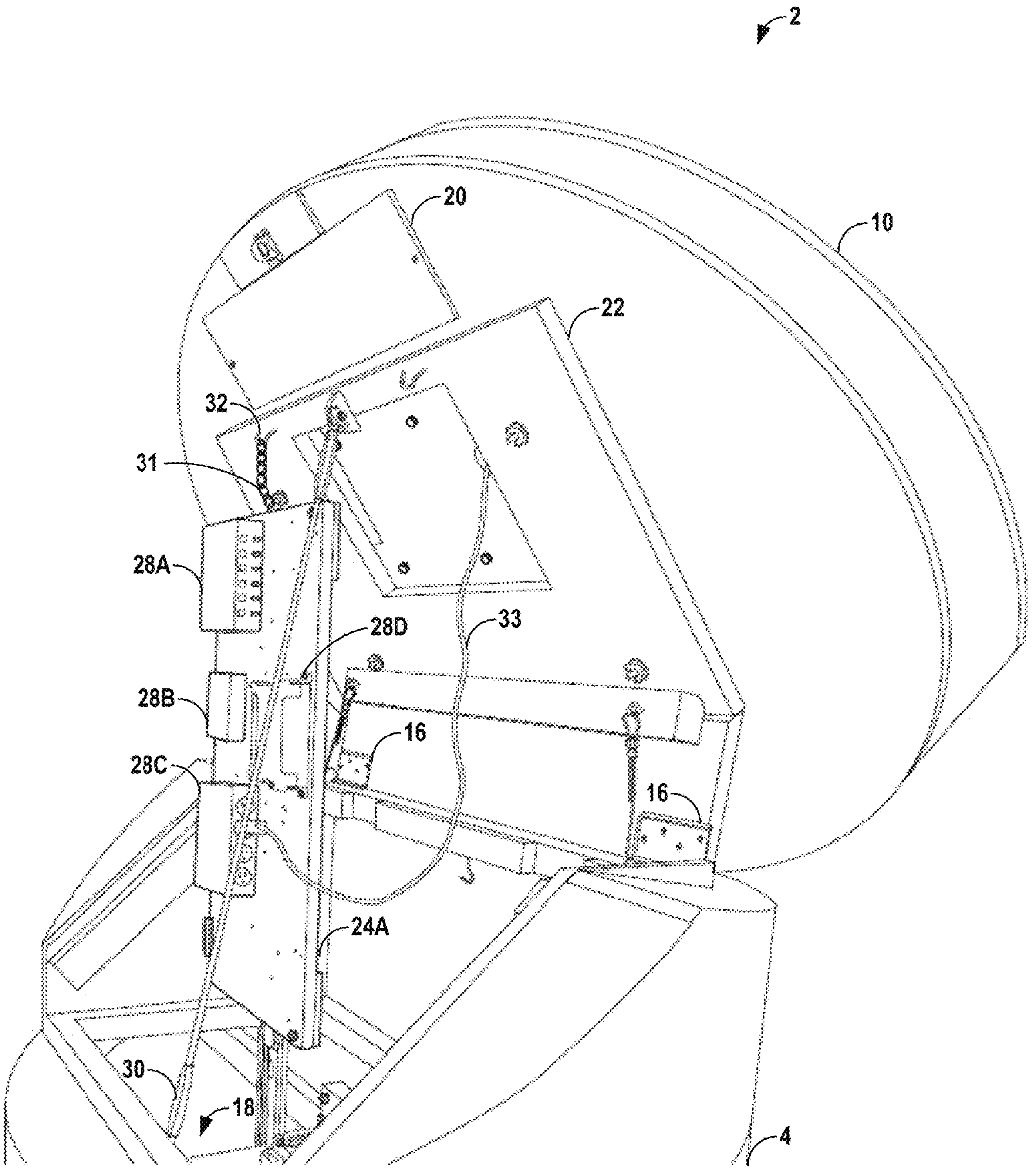
FIG. 7 is a conceptual diagram illustrating a side perspective view of an electronic kiosk with assistance mechanisms and electronic components installed on one of the internal electronic boards, in accordance with the techniques and devices described herein.

FIG. 7 is a conceptual diagram illustrating a side perspective view of electronic kiosk 2 with assistance components 30, 31, and 32, and electronic components 28 installed on internal electronic board 24A, in accordance with the techniques and devices described herein. Additionally, in the example of FIG. 7, hinges 16 are shown to be horizontal hinges attached to an interior portion of base 4 and user interface panel 10 as opposed to the vertical hinges of FIGS. 2-6. In this manner, hinge 16 may be any hinge component attached to user interface panel 10 that enables user interface panel 10 to lift up and around base 4 such that internal compartment 18 is revealed and access to board 24A and electronic components 28 are provided.

In the example of FIG. 7, user interface panel 10 is lifted and board 24A has been raised. Board 24A includes electronic components 28A-28D (collectively, "electronic components 28") installed on board 24 to provide functionality to other portions of electronic kiosk 2; note that for clarity board 24B is not shown raised, though in practice multiple boards—with similar or different electronic components 28—could be included in internal compartment 18. Examples of electronic components 28 include any one or more of one or more processors, one or more communication units, one or more power sources, one or more output components, one or more input components, and one or more storage components.

The one or more processors may implement functionality and/or execute instructions associated with software running on electronic kiosk 2. Examples of processors include application processors, display controllers, auxiliary processors, one or more sensor hubs, and any other hardware configured to function as a processor, a processing unit, or a processing device.

The one or more communication units may communicate with external devices via one or more wired and/or wireless networks by transmitting and/or receiving network signals on one or more networks. Examples of communication units include a network interface card (e.g., such as an Ethernet card), an optical transceiver, a radio frequency transceiver, a GPS receiver, a radio-frequency identification (RFID) transceiver, a near-field communication (NFC) transceiver, or any other type of device that can send and/or receive information. Other examples of communication units may include short wave radios, cellular data radios, wireless network radios, as well as universal serial bus (USB) controllers.

The one or more output components may generate output in a selected modality. Examples of modalities may include a tactile notification, audible notification, visual notification, machine generated voice notification, or other modalities. Output components, in one example, include a presence-sensitive display, a sound card, a video graphics adapter card, a speaker, a cathode ray tube (CRT) monitor, a liquid crystal display (LCD), a light emitting diode (LED) display, an organic LED (OLED) display, a virtual/augmented/extended reality (VR/AR/XR) system, a three-dimensional display, or any other type of device for generating output to a human or machine in a selected modality.

The one or more input components may receive input. Examples of input are tactile, audio, and video input. Input components, in one example, include a presence-sensitive input device (e.g., a touch sensitive screen, a PSD), mouse, keyboard, voice responsive system, camera, microphone or any other type of device for detecting input from a human or machine. In some examples, input components may include one or more sensor components. Sensors may include one or more biometric sensors (e.g., fingerprint sensors, retina scanners, vocal input sensors/microphones, facial recognition sensors, cameras), one or more location sensors (e.g., GPS components, Wi-Fi components, cellular components), one or more environmental sensors (e.g., temperature, moisture, etc.), one or more movement sensors (e.g., accelerometers, gyros), one or more pressure sensors (e.g., barometer), one or more ambient light sensors, and one or more other sensors (e.g., infrared proximity sensor, hygrometer sensor, and the like). Other sensors, to name a few other non-limiting examples, may include a heart rate sensor, magnetometer, glucose sensor, olfactory sensor, compass sensor, or a step counter sensor.

The one or more storage components may store information for processing during operation of electronic kiosk 2. In some examples, the one or more storage components are a temporary memory, meaning that a primary purpose of the one or more storage components is not long-term storage. The one or more storage components may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

The one or more storage components, in some examples, also include one or more computer-readable storage media. The one or more storage components, in some examples, include one or more non-transitory computer-readable storage mediums. The one or more storage components may be configured to store larger amounts of information than typically stored by volatile memory. The one or more storage components may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories.

The one or more power sources may be any component capable of providing electricity to any other component in electronic kiosk 2, including user interface panel 10. The power source may be a battery or an outlet connected to an external power source or system. For instance, in the example of FIG. 7, user interface panel 10 receives power from power source 28C via cord 33 that is connected to user interface panel 10 and plugs into power source 28C.

Additionally, FIG. 7 shows assistance component 30. Assistance component 30 may be any pneumatic, mechanical, electronic, or hydraulic lift device that holds user interface panel 10 aloft without a user needing to apply continuous force to user interface panel 10. In the example of FIG. 7, assistance component 30 is a mechanical lift device that rests inside base 4 of electronic kiosk 2 and is connected to base 4 on one end. After the user lifts user interface panel 10, the user may additionally lift the end of assistance component 30 that is not connected to base 4 and attach assistance component 30 to a hook or a slot in the underside of user interface panel 10. After attaching assistance component 30 to user interface panel 10, assistance component 30 holds user interface panel 10 aloft, allowing the user to access electronic components 28 without restriction. In some instances, assistance component 30 may even provide the initial force to lift user interface panel 10, such as in the instance of assistance component 30 being an electronic lift device.

In some instances, the system of board 24A and a rail in base 4 provides enough resistance that, when board 24A is raised, the resistance keeps board 24A raised without a user having to hold board 24A up. In other instances, electronic kiosk 2 may include additional assistance components, such as assistance components 31 and 32. Assistance components 31 is attached to board 24A and may be a chain, a rope, or any other movable protrusion from a top of board 24A. Assistance component 32 may be attached to an underside of user interface panel 10, and may be a receiver, such as an eyehook or some other type of holding device. When the user lifts board 24A, the user may further attach assistance component 31 to assistance component 32, such as by sliding a link in a chain over an eyehook. In this way, assistance components 31 and 32 may hold board 24A in a raised position, allowing the user to access electronic components 28 without restriction. Other examples of assistance components to hold board 24A aloft include a pin, a lock, a brake, or any other reasonable component that stops board 24A from sliding down a guiding rail.

Figure 8:
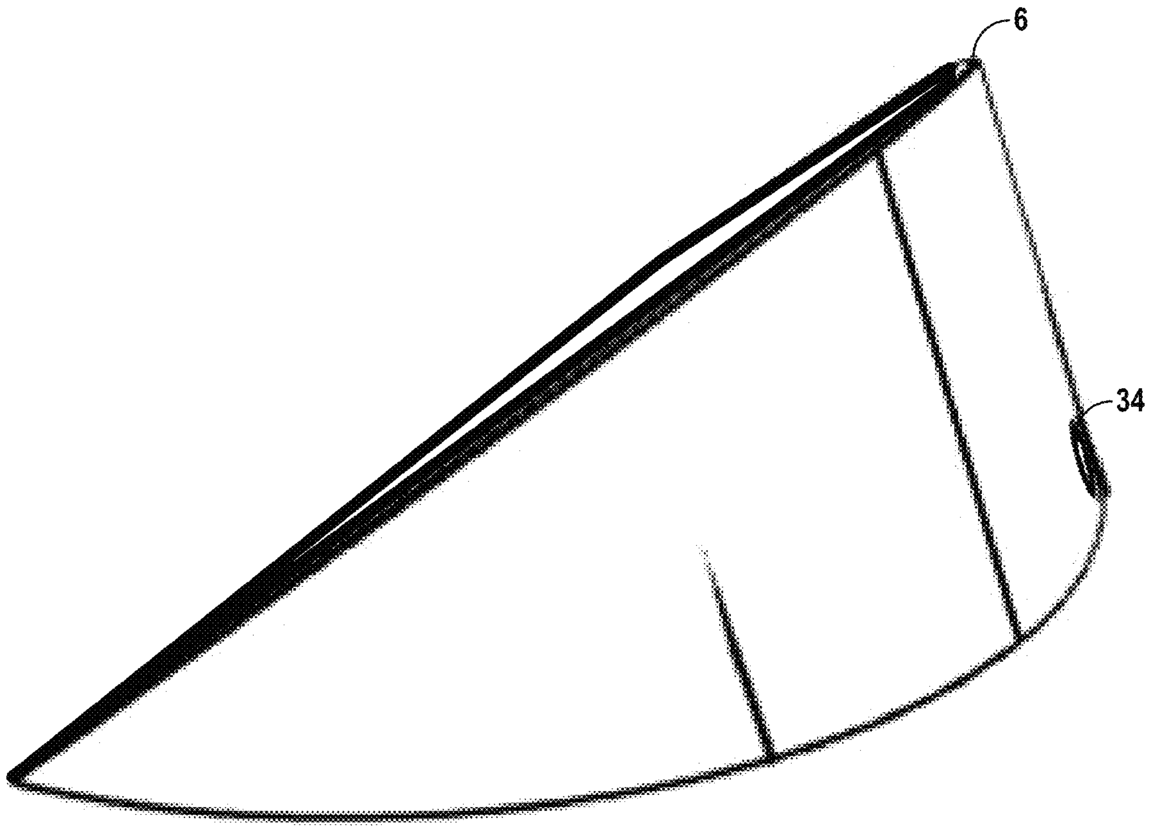
FIG. 8 is a conceptual diagram of a sealing wedge, in accordance with the techniques and devices described herein.

FIG. 8 is a conceptual diagram of sealing wedge 6, in accordance with the techniques and devices described herein. As shown in FIG. 8, sealing wedge 6 may slope such that an internal edge of sealing wedge 6 (internal being defined when sealing wedge 6 is installed in electronic kiosk 2) is shorter than an external edge of sealing wedge 6. By sloping outwards externally, sealing wedge 6 may provide an adequate angle to provide efficient and optimal viewing of user interface panel 10, when installed.

Additionally, sealing wedge 6 may include locking mechanism 34. In the instance of FIG. 8, locking mechanism 34 may be an internal locking mechanism. When a key is inserted into locking mechanism 34 and the key is turned while the key is inserted into locking mechanism 34, locking mechanism 34 may activate in a manner similar to other internal locking mechanisms. For instance, turning the key may cause one or more rods in locking mechanism 34 to rotate, where a protrusion of one of the rotated rods rotates into or out of a slot present in base 4 of the electronic kiosk, thereby either securing sealing wedge 6 in place or causing sealing wedge 6 to become removable. Locking mechanism 34 may be any locking mechanism that can reasonably secure sealing wedge 6 in place, including other types of internal locking mechanisms (e.g., a cylindrical lockset, a deadbolt lock, a mortise lock, a drop-bolt lock, a rim-cylinder lock, a unit lock, an access control device, etc.) or external locking mechanisms (e.g., a padlock with a latch and loop system).

Figure 9:
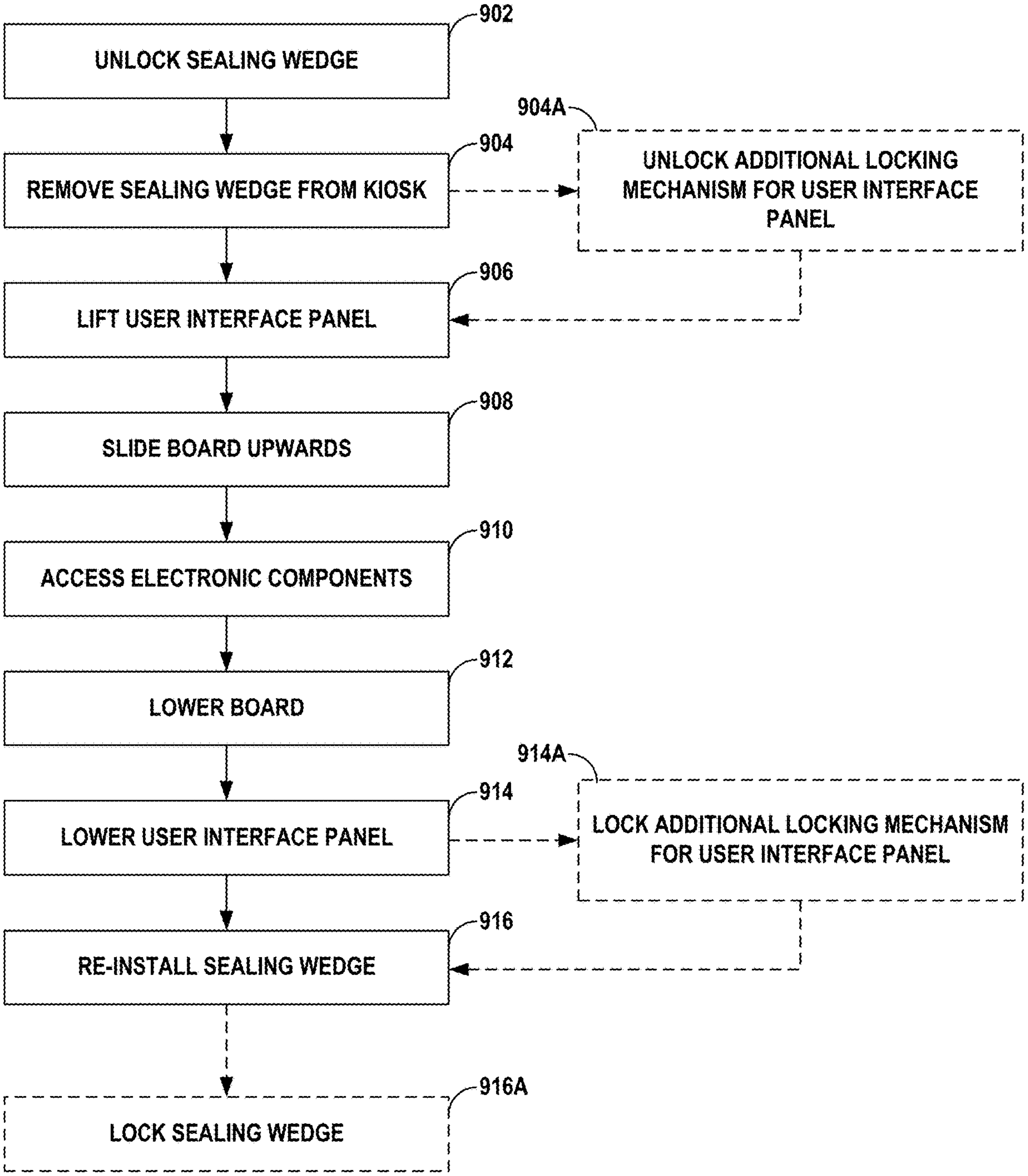
FIG. 9 is a flow diagram illustrating an example method for accessing internal electronic components of an electronic kiosk, in accordance with the techniques and devices described herein.

FIG. 9 is a flow diagram illustrating an example method for accessing internal electronic components of an electronic kiosk, such as electronic kiosk 2 of FIGS. 1-8, in accordance with the techniques and devices described herein.

In accordance with the techniques described herein, a user unlocks lock 34 securing sealing wedge 6 to at least the first portion of the top of base 4 of electronic kiosk 2 (902). The user removes sealing wedge 6 removably attached to at least the first portion of the top of base 4 of electronic kiosk 2 (904). In instances where electronic kiosk 2 includes an additional locking mechanism locking user interface panel 10 in a closed position to base 4, the user may unlock the additional locking mechanism for user interface panel 10 (904A). The user lifts user interface panel 10 of electronic kiosk 2, user interface panel 10 being attached to at least a second portion of the top of base 4 via one or more hinges 16 (906). Lifting user interface panel 10 reveals interior compartment 18 of base 4 of electronic kiosk 2. The user slides board 24A (and/or board 24B) slidably attached to a rail in base 4 upwards to elevate board 24A such that at least a portion of board 24A is above the top of base 4 (908). The one or more electronic components 28 are secured to the board. The user accesses one or more electronic components 28 secured to board 24A (910). The user lowers board 24A back into interior compartment 18 of base 4 (912). The user lowers user interface panel 10 of electronic kiosk 2 (914). In instances where electronic kiosk 2 includes an additional locking mechanism locking user interface panel 10 in a closed position to base 4, the user may lock the locking mechanism that secures user interface panel 10 in the lowered (or closed) position (914A). The user re-installs sealing wedge 6 to at least the first portion of the top of base 4 of electronic kiosk 2 (916), in some instances by optionally locking the sealing wedge in place (916A).

Various examples of the disclosure have been described. Any combination of the described systems, operations, or functions is contemplated. These and other examples are within the scope of the following claims.

What is claimed is:

1. An electronic kiosk, the electronic kiosk comprising:
- a base;
- a user interface panel attached to at least a first portion of a top of the base via one or more hinges; and
- a sealing wedge removably attached to at least a second portion of the top of the base,
- wherein, when the sealing wedge is attached to the top of the base, the user interface panel is locked in place atop the base, and
- wherein, when the sealing wedge is removed from the base, the user interface panel is movable about the one or more hinges.

2. The electronic kiosk of claim 1, wherein the user interface panel moving about the one or more hinges provides access to an interior compartment of the base.

3. The electronic kiosk of claim 2, wherein a top of the interior compartment includes a ridge to prevent water from entering the interior compartment.

4. The electronic kiosk of claim 1, further comprising one or more electronic components housed within the base.

5. The electronic kiosk of claim 4, wherein the one or more electronic components comprise any one or more of:
- one or more processors;
- one or more communication units;
- one or more power sources;
- one or more output components;
- one or more input components; and
- one or more storage components.

6. The electronic kiosk of claim 4, wherein each of the one or more electronic components are installed on a board slidably attached to a rail in the base, wherein the board slides up and down the rail to elevate at least a portion of the board above at least a third portion of the top of the base.

7. The electronic kiosk of claim 1, wherein the sealing wedge includes a lock to secure the sealing wedge in place when attached to at least the second portion of the top of the base.

8. The electronic kiosk of claim 1, further comprising one or more weatherproofing elements, the weatherproofing elements including one or more of:
- one or more gaskets attached to one or more of the sealing wedge, the user interface panel, and the base to create watertight seal between the user interface panel, the sealing wedge, and the base; and
- an acrylic surface attached to a top of the user interface panel.

9. The electronic kiosk of claim 1, further comprising an assistance device that applies force to assist lifting the user interface panel and to keep the user interface panel lifted when raised.

10. The electronic kiosk of claim 9, wherein the assistance component comprises one or more of an electric lift, a pneumatic lift, a hydraulic lift, or a mechanical lift.

11. The electronic kiosk of claim 1, wherein the user interface panel includes one or more access panels on an underside of the user interface panel.

12. The electronic kiosk of claim 11, wherein a first access panel of the one or more access panels, when removed, provides access to a display component of the user interface panel, and wherein a second access panel of the one or more access panels, when removed, provides access to an input component of the user interface panel.

13. The electronic kiosk of claim 1, wherein the user interface panel comprises a display component and an input component.

14. The electronic kiosk of claim 13, wherein the display component displays one of a plurality of user interfaces for presenting information, and wherein the input component navigates between the plurality of user interfaces.

15. The electronic kiosk of claim 1, further comprising one or more air flow vents in one or more of the base or an underside of the user interface panel.

16. The electronic kiosk of claim 1, wherein, when the sealing wedge is installed and the user interface panel is lowered, the user interface panel is angled to create an angle of intersection with the base that is either less than 90 degrees or greater than 90 degrees.

* * * * *